(12) United States Patent
Sugimoto

(10) Patent No.: US 9,797,330 B2
(45) Date of Patent: Oct. 24, 2017

(54) ENGINE APPARATUS

(71) Applicant: Toyota Jidosha Kabushiki Kaisha, Toyota-shi Aichi-ken (JP)

(72) Inventor: Hitoki Sugimoto, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/152,656

(22) Filed: May 12, 2016

(65) Prior Publication Data

US 2016/0333764 A1    Nov. 17, 2016

(30) Foreign Application Priority Data

May 15, 2015   (JP) .................................. 2015-100349

(51) Int. Cl.
*F02D 41/02*   (2006.01)
*F02D 41/24*   (2006.01)
*F02D 29/02*   (2006.01)
*F02D 41/00*   (2006.01)
*F02P 5/15*    (2006.01)
(Continued)

(52) U.S. Cl.
CPC ......... *F02D 41/2406* (2013.01); *F02D 29/02* (2013.01); *F02D 41/0002* (2013.01); *F02D 41/0235* (2013.01); *F02P 5/1502* (2013.01); *B60K 6/24* (2013.01); *B60Y 2200/92* (2013.01); *B60Y 2300/432* (2013.01); *B60Y 2300/47* (2013.01); *F02D 41/22* (2013.01); *F02D 41/2403* (2013.01); *F02D 2041/0265* (2013.01); *F02D 2200/0804* (2013.01); *F02D 2200/1015* (2013.01); *Y10S 903/903* (2013.01);
(Continued)

(58) Field of Classification Search
CPC ............. F02D 41/0235; F02D 41/1498; F02D 2041/0265; F02D 2200/1015
USPC ................ 701/104, 111; 123/436; 73/114.03
See application file for complete search history.

(56) References Cited

U.S. PATENT DOCUMENTS 5,144,927 A * 9/1992 Denz ...................... G01M 15/11
                                                    73/114.03
5,906,187 A * 5/1999 Heuer ................. F02D 41/0085
                                                    123/436
(Continued)

FOREIGN PATENT DOCUMENTS

GB         2387948 A     10/2003
JP       S64-045946 A    2/1989
(Continued)

*Primary Examiner* — Erick Solis
(74) *Attorney, Agent, or Firm* — Dinsmore & Shohl LLP

(57) ABSTRACT

At every ignition cycle, when a duration change amount $\Delta T30[i]$ is equal to or less than a reference value $\Delta T30ref2$, a misfire counter Cmf is kept unchanged. When the duration change amount $\Delta T30[i]$ is greater than the reference value $\Delta T30ref2$, on the other hand, the misfire counter Cmf is incremented by value 1. A misfire ratio Rmf is set to provide a smaller value when an amount increasing determination flag F[i] is equal to value 1 than a value when the amount increasing determination flag F[i] is equal to value 0. In the case where an ignition counter Ci reaches or exceeds a reference value Ciref, it is determined whether a conversion catalyst is overheated by comparison between the misfire counter Cmf and an accumulated misfire ratio Rmfsum that is an accumulated value of the misfire ratio Rmf.

6 Claims, 5 Drawing Sheets

(51) Int. Cl.
*B60K 6/24* (2007.10)
*F02D 41/22* (2006.01)

(52) U.S. Cl.
CPC ........ *Y10S 903/905* (2013.01); *Y10S 903/906* (2013.01); *Y10S 903/907* (2013.01)

(56) References Cited

U.S. PATENT DOCUMENTS

| | | | |
|---|---|---|---|
| 6,199,426 B1 * | 3/2001 | Shibagaki | G01M 15/11 73/114.04 |
| 7,543,483 B2 * | 6/2009 | Akimoto | F02D 35/027 73/114.03 |
| 7,610,798 B1 * | 11/2009 | Hopf | G01M 15/11 73/114.03 |
| 2007/0227122 A1 | 10/2007 | Suenaga et al. | |
| 2008/0295487 A1 * | 12/2008 | Binder | F01N 9/005 60/274 |

FOREIGN PATENT DOCUMENTS

| | | |
|---|---|---|
| JP | 2000-257497 A | 9/2000 |
| JP | 2003-293806 A | 10/2003 |
| JP | 2007-263056 A | 10/2007 |
| JP | 2009264287 A | 11/2009 |
| JP | 2013-117203 A | 6/2013 |

\* cited by examiner

ENGINE APPARATUS

This application claims priority to Japanese Patent Application No. 2015-100349 filed 15 May, 2015, the contents of which is incorporated herein by reference.

TECHNICAL FIELD

The present disclosure relates to an engine apparatus.

BACKGROUND ART

A proposed configuration of an engine apparatus determines the occurrence of lean imbalance when a rotation variation that denotes a variation in rotation speed of an engine per unit time is equal to or greater than a reference value, and starts increasing the amount of fuel injection with regard to a lean cylinder (for example, Patent Literature 1). This engine apparatus performs such control to suppress a misfire in the lean cylinder and poor emission caused by the misfire.

CITATION LIST

Patent Literature

PTL 1: JP 2013-117203A

SUMMARY

In the engine apparatus described above, the rotation variation is expected to become equal to or greater than the reference value in the case where no misfire occurs in any of the cylinders but the amount of fuel injection in part of the cylinders is less than the amount of fuel injection in the other cylinders or in the case where a misfire occurs in part of the cylinders. In the case where a misfire occurs in part of the cylinders by a trouble in an ignition system, increasing the amount of fuel injection is likely to be started in this cylinder regarded as lean cylinder. This increases the amount of non-combusted gas flowing into a catalyst included in a catalytic converter placed in an exhaust system of the engine and increases the degree of a temperature rise of the catalyst by combustion reaction of the non-combusted gas and the catalyst. The catalyst is thus likely to be overheated. There is accordingly a need to detect overheat of the catalyst more reliably in the event that the catalyst is overheated.

With regard to the engine apparatus, an object is to detect overheat of a catalyst more reliably in the event that the catalyst included in a catalytic converter installed in an exhaust system of an engine is overheated.

In order to achieve the object described above, the engine apparatus of the disclosure may be implemented by the following aspects.

According to one aspect of the disclosure, there is provided a first engine apparatus including: an engine that is configured to have a plurality of cylinders; a catalytic converter that is configured to include a catalyst for emission control of the engine; and a controller that is configured to compute an amount of change in a time period required for rotating an output shaft of the engine by a predetermined rotational angle at every predetermined cycle that is equal to or shorter than an ignition cycle of the engine, and when the amount of change is greater than a first reference value, to start a predetermined amount increasing operation with regard to a cylinder that is in an expansion stroke during computation of the amount of change among the plurality of cylinders, such as to increase an amount of fuel injection to be greater than an amount of fuel injection when the amount of change is equal to or less than the first reference value, wherein at every predetermined cycle, the controller keeps a value of a counter unchanged when the amount of change is equal to or less than a second reference value that is larger than the first reference value, while incrementing the value of the counter when the amount of change is greater than the second reference value, in a case where a number of ignitions in the engine reaches or exceeds a predetermined number of times, the controller determines that the catalyst is overheated when the value of the counter is larger than a specified value, and the controller provides a smaller value as the specified value when the predetermined amount increasing operation is performed with regard to part of the cylinders of the engine, compared with a value when the predetermined amount increasing operation is not performed with regard to any of the cylinders of the engine.

The first engine apparatus of this aspect computes the amount of change in the time period (hereinafter referred to as "duration change amount") required for rotating the output shaft of the engine by the predetermined rotational angle (hereinafter referred to as "rotation duration") at every predetermined cycle that is equal to or shorter than the ignition cycle (ignition period) of the engine. When the duration change amount is greater than the first reference value, the predetermined amount increasing operation is started with regard to the cylinder that is in the expansion stroke during computation of the duration change amount among the plurality of cylinders, such as to increase the amount of fuel injection to be greater than the amount of fuel injection when the duration change amount is equal to or less than the first reference value. At every predetermined cycle, the first engine apparatus keeps the value of the counter unchanged when the duration change amount is equal to or less than the second reference value that is larger than the first reference value, while incrementing the value of the counter when the duration change amount is greater than the second reference value. In the case where the number of ignitions in the engine reaches or exceeds the predetermined number of times, the first engine apparatus determines that the catalyst is overheated when the value of the counter is larger than the specified value. The first engine apparatus provides the smaller value as the specified value when the predetermined amount increasing operation is performed with regard to part of the cylinders of the engine, compared with the value when the predetermined amount increasing operation is not performed with regard to any of the cylinders of the engine. This configuration enables overheat of the catalyst to be determined (detected) more reliably in the event that the catalyst is overheated. The "duration change amount" may be computed by subtracting a previous rotation duration computed prior to a second predetermined rotational angle (for example, rotational angle of the output shaft corresponding to the ignition cycle (180 degrees in the case of four cylinders)) from the latest computed rotation duration.

According to another aspect of the disclosure, there is provided a second engine apparatus including: an engine that is configured to have a plurality of cylinders; a catalytic converter that is configured to include a catalyst for emission control of the engine; a notifier that is configured to provide a warning; and a controller that is configured to compute an amount of change in a time period required for rotating an output shaft of the engine by a predetermined rotational angle at every predetermined cycle that is equal to or shorter than an ignition cycle of the engine, and when the amount of change is greater than a first reference value, to start a predetermined amount increasing operation with regard to a cylinder that is in an expansion stroke during computation of the amount of change among the plurality of cylinders, such as to increase an amount of fuel injection to be greater than an amount of fuel injection when the amount of change is equal to or less than the first reference value, wherein at every predetermined cycle, the controller keeps a value of a counter unchanged when the amount of change is equal to or less than a second reference value that is larger than the first reference value, while incrementing the value of the counter when the amount of change is greater than the second reference value, in a case where a number of ignitions in the engine reaches or exceeds a predetermined number of times, the controller controls the notifier to provide a warning indicating that the catalyst is overheated when the value of the counter is larger than a specified value, and the controller provides a smaller value as the specified value when the predetermined amount increasing operation is performed with regard to part of the cylinders of the engine, compared with a value when the predetermined amount increasing operation is not performed with regard to any of the cylinders of the engine.

The second engine apparatus of this aspect computes the amount of change in the time period (hereinafter referred to as "duration change amount") required for rotating the output shaft of the engine by the predetermined rotational angle (hereinafter referred to as "rotation duration") at every predetermined cycle that is equal to or shorter than the ignition cycle (ignition period) of the engine. When the duration change amount is greater than the first reference value, the predetermined amount increasing operation is started with regard to the cylinder that is in the expansion stroke during computation of the duration change amount among the plurality of cylinders, such as to increase the amount of fuel injection to be greater than the amount of fuel injection when the duration change amount is equal to or less than the first reference value. At every predetermined cycle, the second engine apparatus keeps the value of the counter unchanged when the duration change amount is equal to or less than the second reference value that is larger than the first reference value, while incrementing the value of the counter when the duration change amount is greater than the second reference value. In the case where the number of ignitions in the engine reaches or exceeds the predetermined number of times, the second engine apparatus controls the notifier to provide a warning indicating that the catalyst is overheated when the value of the counter is larger than the specified value. The second engine apparatus provides the smaller value as the specified value when the predetermined amount increasing operation is performed with regard to part of the cylinders of the engine, compared with the value when the predetermined amount increasing operation is not performed with regard to any of the cylinders of the engine. This configuration enables overheat of the catalyst to be determined (detected) more reliably in the event that the catalyst is overheated. The "duration change amount" may be computed by subtracting a previous rotation duration computed prior to a second predetermined rotational angle (for example, rotational angle of the output shaft corresponding to the ignition cycle (180 degrees in the case of four cylinders) from the latest computed rotation duration.

DETAILED DESCRIPTION

The following describes some aspects of the disclosure with reference to an embodiment.

Figure 1:
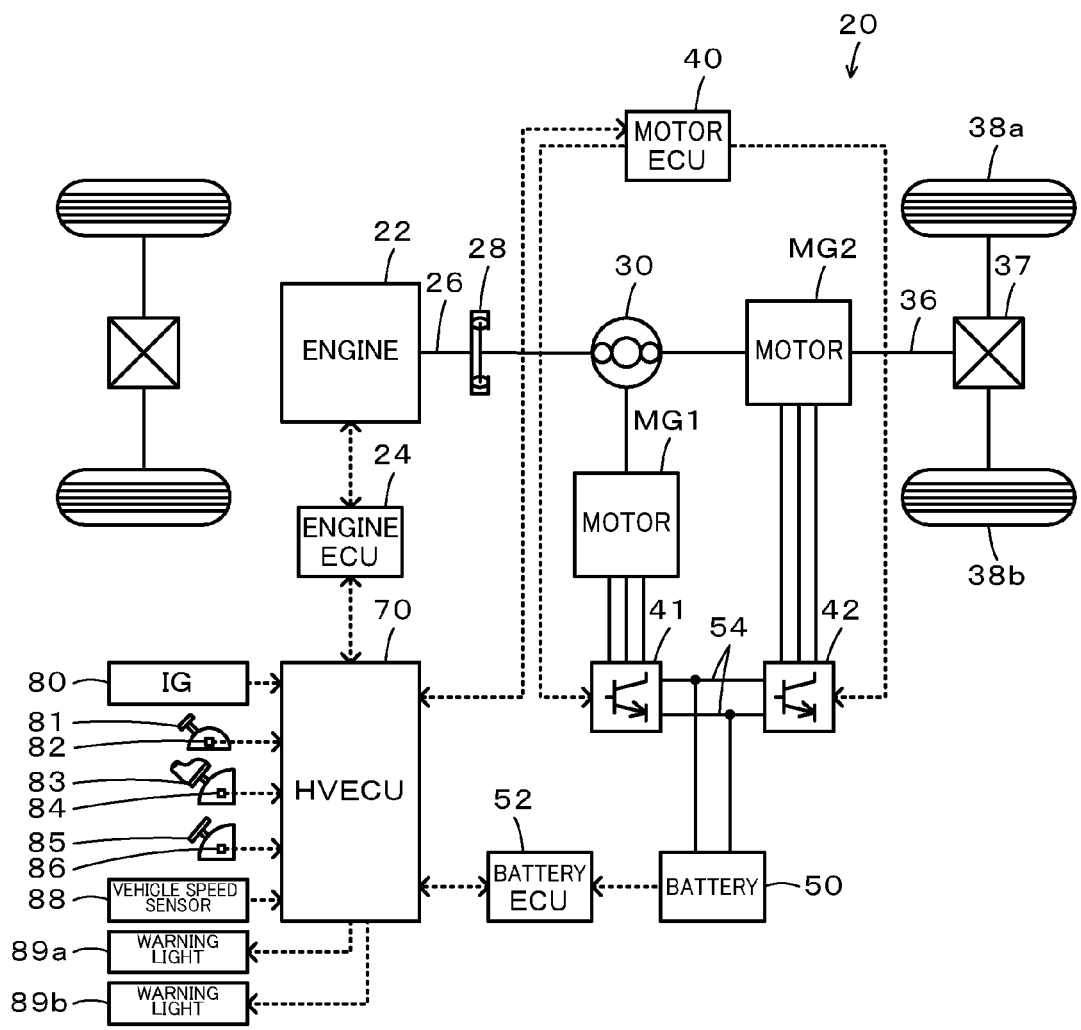
FIG. 1 is a configuration diagram illustrating the schematic configuration of a hybrid vehicle equipped with an engine apparatus according to an embodiment of the disclosure.

FIG. 1 is a configuration diagram illustrating the schematic configuration of a hybrid vehicle 20 equipped with an engine apparatus according to an embodiment of the disclosure. As illustrated, the hybrid vehicle 20 of the embodiment includes an engine 22, a planetary gear 30, motors MG1 and MG2, inverters 42 and 42, a battery 50 and a hybrid electronic control unit (hereinafter referred to as "HVECU") 70.

Figure 2:
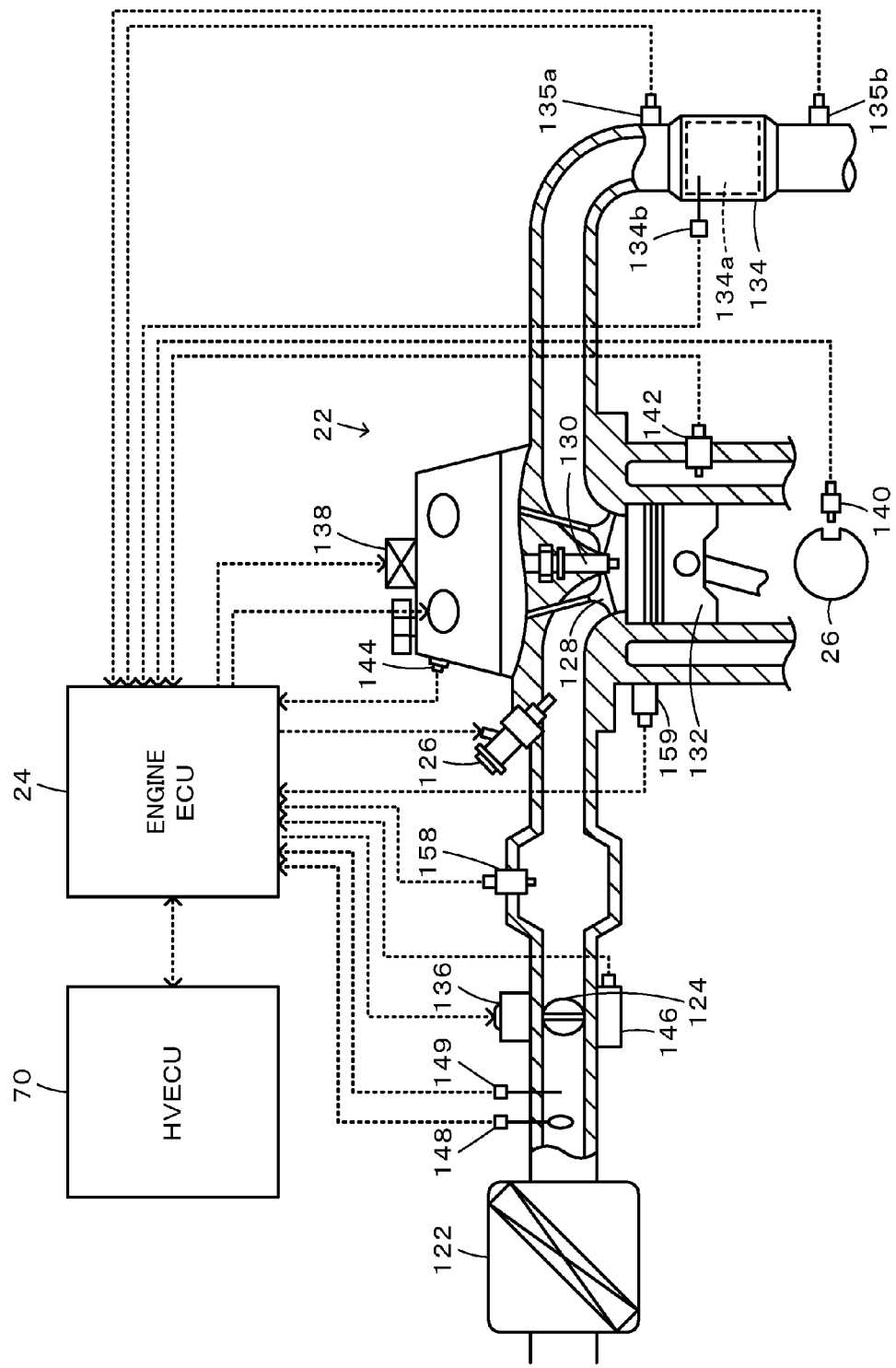
FIG. 2 is a configuration diagram illustrating the schematic configuration of an engine.

The engine 22 is configured as an internal combustion engine that has four cylinders and outputs power in four strokes, i.e., intake, compression, expansion and exhaust, using a fuel such as gasoline or light oil. FIG. 2 is a configuration diagram illustrating the schematic configuration of the engine 22. As illustrated, the engine 22 takes in the air cleaned by an air cleaner 122 via a throttle valve 124, injects the fuel from fuel injection valves 126 and mixes the intake air with the fuel. The air-fuel mixture is sucked into a combustion chamber via an intake valve 128. The sucked air-fuel mixture is explosively combusted with electric spark generated by an ignition plug 130. The engine 22 converts the reciprocating motion of a piston 132 pressed down by the energy of explosive combustion into the rotational motion of a crankshaft 26. The exhaust gas from the engine 22 is discharged to the outside air through a catalytic converter 134 that is filled with a conversion catalyst (three-way catalyst) 134a to convert toxic components such as carbon monoxide (CO), hydrocarbons (HC) and nitrogen oxides (NOx) to less toxic components.

The engine 22 is operated and controlled by an engine electronic control unit (hereinafter referred to as "engine ECU") 24. The engine ECU 24 is implemented by a CPU-based microprocessor and includes a ROM that stores processing programs, a RAM that temporarily stores data, input and output ports and a communication port other than the CPU, although not being illustrated. As shown in FIG. 2, the engine ECU 24 inputs, via its input port, signals from various sensors required for operation control of the engine 22. Examples of the signals input into the engine ECU 24 include:

crank angle $\theta cr$ from a crank position sensor 140 configured to detect the rotational position of the crankshaft 26;

cooling water temperature Tw from a water temperature sensor 142 configured to detect the temperature of cooling water of the engine 22;

cam angles $\theta ci$ and $\theta co$ from a cam position sensor 144 configured to detect the rotational position of an intake cam shaft that opens and closes the intake valve 128 and the rotational position of an exhaust cam shaft that opens and closes an exhaust valve;

throttle position TH from a throttle valve position sensor 146 configured to detect the position of the throttle valve 124;

amount of intake air Qa from an air flowmeter 148 mounted to an intake pipe;

intake air temperature Ta from a temperature sensor 149 mounted to the intake pipe;

intake pressure Pin from an intake pressure sensor 158 configured to detect the internal pressure of the intake pipe;

catalyst temperature Tc from a temperature sensor 134b configured to detect the temperature of the conversion catalyst 134a in the catalytic converter 134;

air-fuel ratio AF from an air-fuel ratio sensor 135a;

oxygen signal $O_2$ from an oxygen sensor 135b; and knocking signal Ks from a knocking sensor 159 mounted to a cylinder block and configured to detect a vibration induced by the occurrence of knocking.

The engine ECU 24 outputs, via its output port, various control signals for operation control of the engine 22. Examples of the signals output from the engine ECU 24 include:

drive control signal to a throttle motor 136 configured to adjust the position of the throttle valve 124;

drive control signals to the fuel injection valves 126; and drive control signals to ignition coils 138 integrated with igniters.

The engine ECU 24 is connected with the HVECU 70 via the respective communication ports to operate and control the engine 22 in response to control signals from the HVECU 70 and output data regarding the operating conditions of the engine 22 to the HVECU 70 as appropriate. The engine ECU 24 computes the rotation speed of the crankshaft 26 or, in other words, a rotation speed Ne of the engine 22, based on the crank angle θcr from the crank position sensor 140. The engine ECU 24 also computes a volume efficiency (ratio of the volume of the air actually taken in one cycle to the stroke volume per cycle of the engine 22) KL, based on the amount of intake air Qa from the air flowmeter 148 and the rotation speed Ne of the engine 22. According to the embodiment, the engine 22 and the engine ECU 24 correspond to the "engine apparatus".

As shown in FIG. 1, the planetary gear 30 is configured as a single pinion-type planetary gear mechanism. The planetary gear 30 has a sun gear that is connected with a rotor of the motor MG1. The planetary gear 30 has a ring gear that is connected with a driveshaft 36 linked with drive wheels 38a and 38b via a differential gear 37. The planetary gear 30 has a carrier that is connected with the crankshaft 26 of the engine 22 via a damper 28 as torsion element.

The motor MG1 is configured, for example, as a synchronous motor generator and has the rotor that is connected with the sun gear of the planetary gear 30 as described above. The motor MG2 is configured, for example, as a synchronous motor generator and has a rotor that is connected with the driveshaft 36. The inverters 41 and 42 are connected with the battery 50 via power lines 54. The motors MG1 and MG2 are rotated and driven by switching control of a plurality of switching elements (not shown) of the inverters 41 and 42 by a motor electronic control unit (hereinafter referred to as "motor ECU") 40.

The battery 50 is configured, for example, as a lithium ion secondary battery or a nickel hydride secondary battery. This battery 50 is connected with the inverters 41 and 42 via the power lines 54 as described above. This battery 50 is under management of a battery electronic control unit (hereinafter referred to as "battery ECU") 52.

The HVECU 70 is implemented by a CPU-based microprocessor and includes a ROM that stores processing programs, a RAM that temporarily stores data, input and output ports and a communication port other than the CPU, although not being illustrated. The HVECU 70 inputs, via its input port, signals from various sensors. Examples of the signals input into the HVECU 70 include:

ignition signal from an ignition switch 80;

shift position SP from a shift position sensor 82 configured to detect the operational position of a shift lever 81;

accelerator position Acc from an accelerator pedal position sensor 84 configured to detect the depression amount of an accelerator pedal 83;

brake pedal position BP from a brake pedal position sensor 86 configured to detect the depression amount of a brake pedal 85; and vehicle speed V from a vehicle speed sensor 88.

The HVECU 70 outputs, for example, control signals to warning lights 89a and 89b via its output port. The HVECU 70 is connected with the engine ECU 24, the motor ECU 40 and the battery ECU 52 via the communication ports to transmit various control signals and data to and from the engine ECU 24, the motor ECU 40 and the battery ECU 52.

The hybrid vehicle 20 of the embodiment having the above configuration sets a required driving force for the driveshaft 36 based on the accelerator position Acc and the vehicle speed V and performs operation control of the engine 22 and the motors MG1 and MG2 to output a required power meeting the required driving force to the driveshaft 36. The following three modes (A1) to (A3) are provided as the operation mode of the engine 22 and the motors MG1 and MG2:

(A1) torque conversion operation mode: mode that performs operation control of the engine 22 to cause the engine 22 to output a power corresponding to the required power, while performing drive control of the motors MG1 and MG2 to make the entire power output from the engine 22 subjected to torque conversion by the planetary gear 30 and the motors MG1 and MG2 and thereby output the required power to the driveshaft 36;

(A2) charge-discharge operation mode: mode that performs operation control of the engine 22 to cause the engine 22 to output a power meeting the sum of the required power and an electric power to be charged into or discharged from the battery 50, while performing drive control of the motors MG1 and MG2 to make the entire power or part of the power output from the engine 22 subjected to torque conversion by the planetary gear 30 and the motors MG1 and MG2 accompanied with charging or discharging the battery 50 and thereby output the required power to the driveshaft 36; and (A3) motor operation mode: mode that stops operation of the engine 22, while performing drive control of the motor MG2 to output the required power to the driveshaft 36.

In the case of operating the engine 22, the hybrid vehicle 20 of the embodiment performs intake air amount control, fuel injection control and ignition control of the engine 22 to operate the engine 22 at a target operation point (defined by a target rotation speed Ne* and a target torque Te*). The hybrid vehicle 20 first sets a target throttle position TH* and target amounts of fuel injection Qf*[1] to Qf*[4] and target ignition timings IT*[1] to IT*[4] with regard to the respective cylinders [1] to [4] (numerals in brackets indicate cylinder numbers) of the four cylinders, based on the target rotation speed Ne* and the target torque Te*. The intake air amount control drives and controls the throttle motor 136 to make the throttle position TH equal to the target throttle position TH*. The fuel injection control drives and controls the fuel injection valves 126 of the respective cylinders [1] to [4] to perform fuel injection with the target amounts of fuel injection Qf*[1] to Qf*[4]. The ignition control drives and controls the ignition coils 138 of the respective cylinders [1] to [4] to perform ignition at the target ignition timings IT*[1] to IT*[4].

Figure 3:
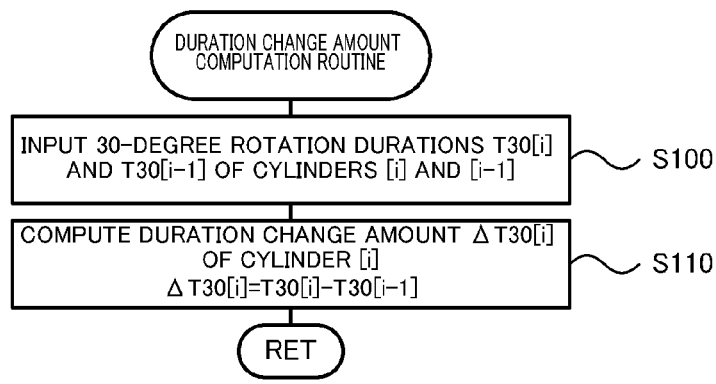
FIG. 3 is a flowchart showing one example of duration change amount computation routine performed by an engine ECU.
Figure 4:
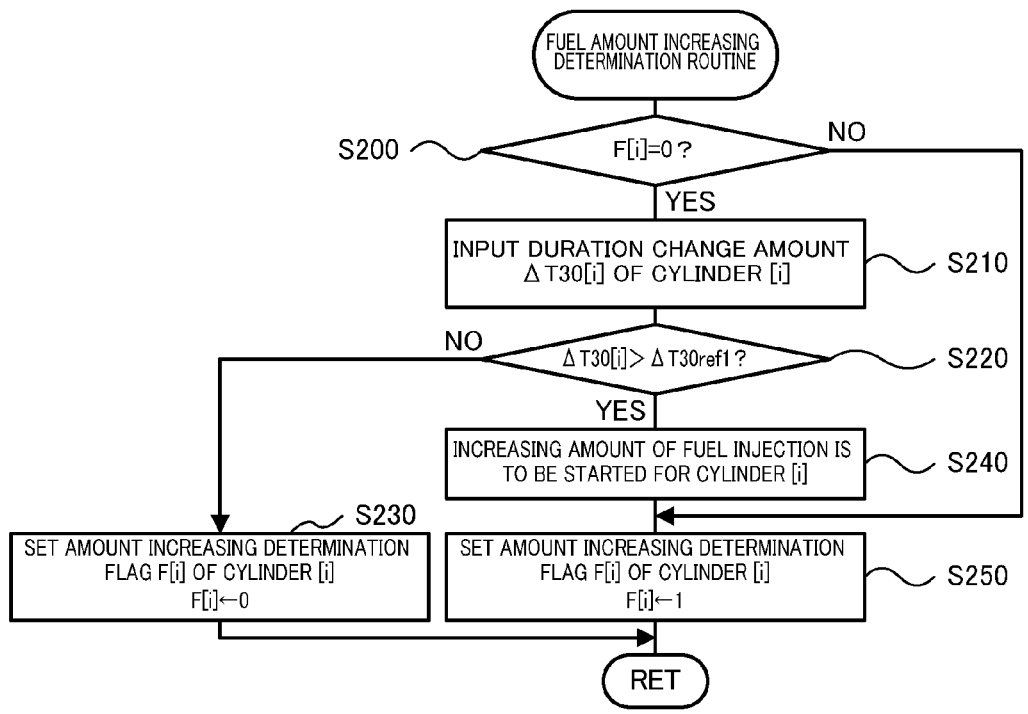
FIG. 4 is a flowchart showing one example of fuel amount increasing determination routine performed by the engine ECU.
Figure 5:
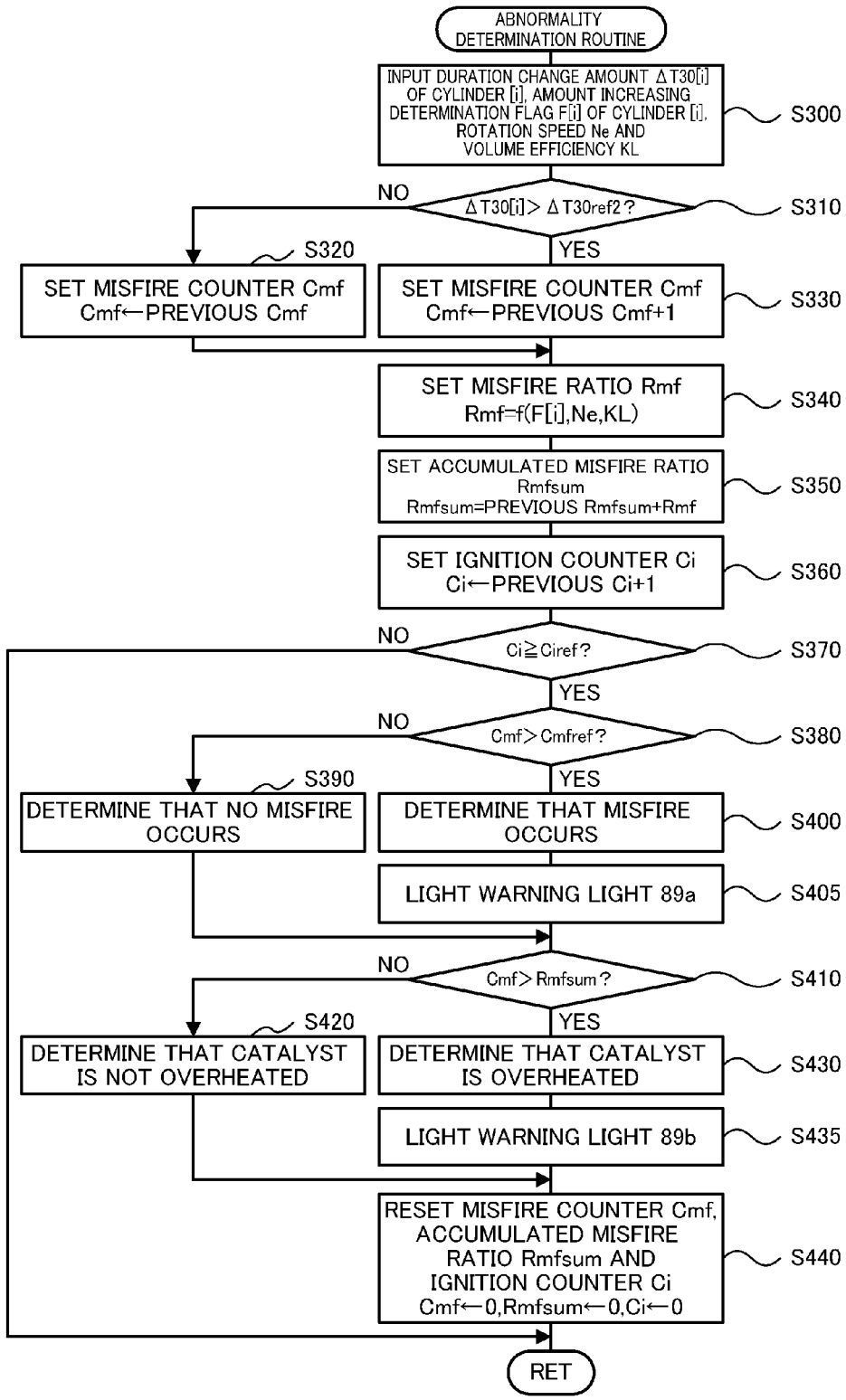
FIG. 5 is a flowchart showing one example of abnormality determination routine performed by the engine ECU.

The following describes the operations of the hybrid vehicle 20 of the embodiment having the above configuration or more specifically a series of operations to determine whether the engine 22 has a misfire and to determine whether the conversion catalyst 134a is overheated. FIG. 3 is a flowchart showing one example of duration change amount computation routine performed by the engine ECU 24 of the embodiment. FIG. 4 is a flowchart showing one example of fuel amount increasing determination routine performed by the engine ECU 24. FIG. 5 is a flowchart showing one example of abnormality determination routine performed by the engine ECU 24. The following sequentially describes these routines. The embodiment uses the four-cylinder engine 22 and accordingly performs ignition in one of the cylinders at every 180 degrees by the rotational angle of the crankshaft 26. In the description below, "ignition cycle" corresponds to 180 degrees by the rotational angle of the crankshaft 26.

The duration change amount computation routine of FIG. 3 is described first. This routine is performed every time a 30-degree rotation duration T30 is computed with regard to each cylinder. The 30-degree rotation duration T30 denotes a time period required for rotation of the crankshaft 26 by 30 degrees. The 30-degree rotation duration T30 with regard to each cylinder is obtained as a measured time period required for rotating the crank angle θcr from the crank position sensor 140 by 30 degrees from the top dead center of each cylinder. In other words, this routine is performed at every ignition cycle.

On start of the routine of FIG. 3, the engine ECU 24 first inputs 30-degree rotation durations T30[i] and T30[i−1] with regard to cylinders [i] and [i−1] (step S100). The cylinders [i] and [i−1] respectively denote a cylinder corresponding to the 30-degree rotation duration T30 computed at a latest ignition cycle and a cylinder corresponding to the 30-degree rotation duration T30 computed at a previous ignition cycle (i.e., cylinders in the expansion stroke at the times of computation of the 30-degree rotation durations T30[i] and T30[i−1]). More specifically, the combination of the cylinders [i] and [i−1] is one of the combinations ([1], [4]), ([2], [1]), ([3], [2]) and ([4], [3]).

The engine ECU 24 subsequently subtracts the 30-degree rotation duration T30[i−1] with regard to the cylinder [i−1] from the 30-degree rotation duration T30[i] with regard to the cylinder [i] to compute a duration change amount ΔT30[i] with regard to the cylinder [i] (step S110) and terminates this routine.

The fuel amount increasing determination routine of FIG. 4 is described next. This routine is performed every time the duration change amount ΔT30 is computed by the routine of FIG. 3 (at every ignition cycle). On start of the routine of FIG. 4, the engine ECU 24 first checks the setting of an amount increasing determination flag F[i] with regard to the cylinder [i] as a current target cylinder (step S200). The cylinder [i] denotes a cylinder corresponding to the latest computed duration change amount ΔT30 (i.e., a cylinder in the expansion stroke at the time of computation of the duration change amount ΔT30[i] and at the time of execution of this routine). The amount increasing determination flag F[i] with regard to the cylinder [i] is a flag that indicates whether the amount of fuel injection with regard to the cylinder [i] is increased (at step S240 described later) and is set by the processing of steps S240 and S250 in a previous cycle of this routine.

When the amount increasing determination flag F[i] is equal to value 0, it is determined that the amount of fuel injection is not increased with regard to the cylinder [i]. The engine ECU 24 then inputs a duration change amount ΔT30[i] with regard to the cylinder [i] (step S210) and compares the input duration change amount ΔT30[i] with regard to the cylinder [i] with a reference value ΔT30ref1 (step S220). The value computed by the routine of FIG. 3 is input as the duration change amount ΔT30[i] with regard to the cylinder [i]. The reference value ΔT30ref1 is a threshold value used to determine whether the air-fuel ratio in the cylinder [i] is likely to be leaner than the air-fuel ratios in the other cylinders, and is determined by experiment or by analysis according to the rotation speed Ne of the engine 22 and the volume efficiency KL. The reference value ΔT30ref1 may be, for example, 90 μsec, 95 μsec or 100 μsec at the rotation speed Ne of the engine 22 equal to 1500 rpm and the volume efficiency KL equal to 60%.

The following two cases (B1) and (B2) are expected as the reason to make the duration change amount ΔT30[i] greater than the reference value ΔT30ref1:

(B1) in the case where no misfire occurs in the cylinder [i] but the amount of fuel injection in the cylinder [i] is less than the amounts of fuel injection in the other cylinders; and (B2) in the case where a misfire occurs in the cylinder [i].

The following two cases (C1) and (C2) are expected as the cause of a misfire in the cylinder [i]:

(C1) in the case of a failure of fuel ignition by a trouble in the fuel supply system such as the fuel injection valve 126; and (C2) in the case of a failure of ignition by a trouble in the ignition system such as the ignition plug 130 or the ignition coil 138.

When the duration change amount ΔT30[i] is equal to or less than the reference value ΔT30ref1 at step S210, it is determined that the air-fuel ratio in the cylinder [i] is not leaner than the air-fuel ratios in the other cylinders (i.e., is equivalent to the air-fuel ratios in the other cylinders). The engine ECU 24 then sets the amount increasing determination flag F[i] with regard to the cylinder [i] to the value 0 (step S230) and terminates this routine.

When the duration change amount ΔT30[i] is greater than the reference value ΔT30ref1 at step S210, on the other hand, it is determined that the air-fuel ratio in the cylinder [i] is likely to be leaner than the air-fuel ratios in the other cylinders. The engine ECU 24 then determines that increasing the amount of fuel injection is to be started with regard to the cylinder [i] (step S240), sets the amount increasing determination flag F[i] with regard to the cylinder [i] to value 1 (step S250) and terminates this routine. Upon determination that increasing the amount of fuel injection is to be started with regard to the cylinder [i], the target amount of fuel injection Qf* with regard to the cylinder [i] is multiplied by a predetermined value (for example, 1.1 times or 1.2 times of the value without such determination). In the case where the amount of fuel injection with regard to the cylinder [i] is actually increased (i.e., in the case where the duration change amount ΔT30[i] becomes greater than the reference value ΔT30ref1 because of the reason (B1) described above), this reduces the likelihood of a trouble such as overheat of the conversion catalyst 134a or poor emission due to the less amount of fuel injection in part of the cylinders.

The abnormality determination routine of FIG. 5 is described next. This routine is performed every time the duration change amount ΔT30 is computed by the routine of FIG. 3 (at every ignition cycle). On start of the routine of FIG. 5, the engine ECU 24 first inputs data including the duration change amount ΔT30[i] with regard to the cylinder [i] as a current target cylinder, the amount increasing determination flag F[i] with regard to the cylinder [i], the rotation speed Ne of the engine 22 and the volume efficiency KL (step S300). The cylinder [i] denotes a cylinder corresponding to the latest computed duration change amount ΔT30 (i.e., a cylinder in the expansion stroke at the time of computation of the duration change amount ΔT30[i] and at the time of execution of this routine). The value computed by the routine of FIG. 3 is input as the duration change amount ΔT30[i] with regard to the cylinder [i]. The value set by the routine of FIG. 4 is input as the amount increasing determination flag F[i] with regard to the cylinder [i]. The value computed based on the crank angle θcr from the crank position sensor 140 is input as the rotation speed Ne of the engine 22. The value computed based on the amount of intake air Qa from the air flowmeter 148 and the rotation speed Ne of the engine 22 is input as the volume efficiency KL.

After inputting the data, the engine ECU 24 compares the input duration change amount ΔT30[i] with regard to the cylinder [i] with a reference value ΔT30ref2 that is larger than the reference value ΔT30ref1 described above (step S310). The reference value ΔT30ref2 is a threshold value used to determine whether a misfire is likely to occur in the cylinder [i], and is determined by experiment or by analysis according to the rotation speed Ne of the engine 22 and the volume efficiency KL. The reference value ΔT30ref2 may be, for example, 120 μsec, 125 μsec or 130 μsec at the rotation speed Ne of the engine 22 equal to 1500 rpm and the volume efficiency KL equal to 60%.

When the duration change amount ΔT30[i] with regard to the cylinder [i] is equal to or less than the reference value ΔT30ref2 at step S310, it is determined that no misfire occurs in the cylinder [i]. The engine ECU 24 then keeps a misfire counter Cmf unchanged (step S320). When the duration change amount ΔT30[i] with regard to the cylinder [i] is greater than the reference value ΔT30ref2, on the other hand, it is determined that a misfire is likely to occur in the cylinder [i]. The engine ECU 24 then increments the misfire counter Cmf by value 1 (step S330). This misfire counter Cmf is set to value 0 as an initial value when operation of the engine 22 is started, and is reset to the value 0 by the processing of step S440 described later.

Figure 6:
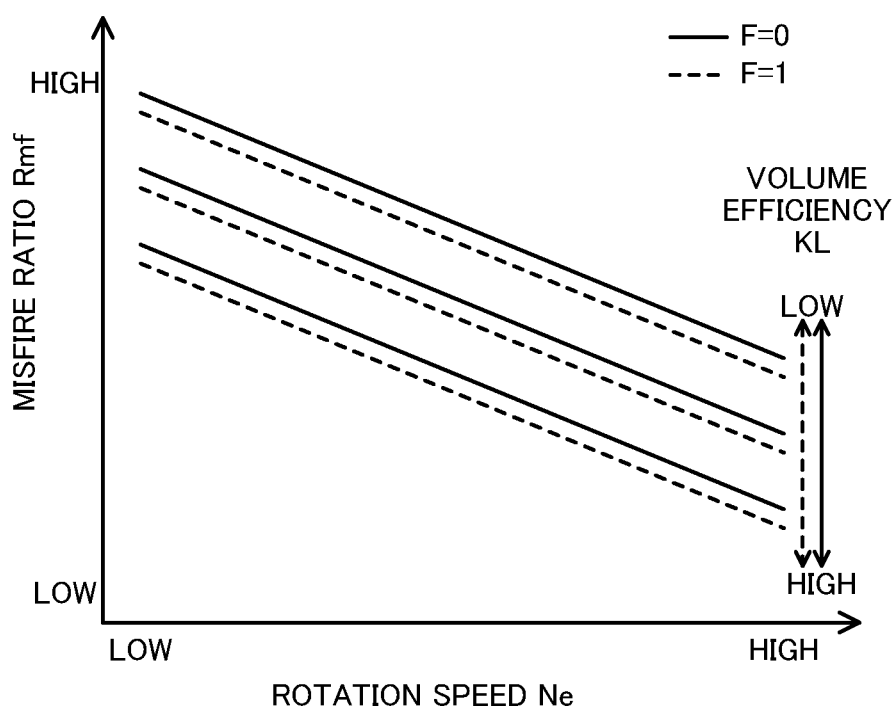
FIG. 6 is a diagram illustrating one example of a misfire ratio setting map.

The engine ECU 24 subsequently sets a misfire ratio Rmf, based on the amount increasing determination flag F[i] with regard to the cylinder [i], the rotation speed Ne of the engine 22 and the volume efficiency KL (step S340), and updates an accumulated misfire ratio Rmfsum by adding the set misfire ratio Rmf to a previous accumulated misfire ratio (previous Rmfsum) (step S350). The accumulated misfire ratio Rmfsum is a threshold value used to determine whether the conversion catalyst 134a is overheated, and the misfire ratio Rmf is a value to be accumulated for setting the accumulated misfire ratio Rmfsum. The accumulated misfire ratio Rmfsum is set to value 0 as an initial value when operation of the engine 22 is started, and is reset to the value 0 by the processing of step S440 described later. According to this embodiment, a procedure of setting the misfire ratio Rmf specifies and stores in advance a relationship of the misfire ratio Rmf to the amount increasing determination flag F[i] with regard to the cylinder [i], the rotation speed Ne of the engine 22 and the volume efficiency KL in the form of a misfire ratio setting map. A misfire ratio Rmf corresponding to a given setting of the amount increasing determination flag F[i] with regard to the cylinder [i], a given rotation speed Ne of the engine 22 and a given volume efficiency KL is read from this map to be set. One example of the misfire ratio setting map is shown in FIG. 6. As illustrated, the misfire ratio Rmf is set to be smaller at the amount increasing determination flag F[i] of 1 than the value at the amount increasing determination flag F[i] of 0 and is set to tend to decrease with an increase in rotation speed Ne of the engine 22 and with an increase in volume efficiency KL. For example, at the volume efficiency KL of 50%, the misfire ratio Rmf is 0.19, 0.2 or 0.21 when the rotation speed Ne of the engine 22 is 1000 rpm and the amount increasing determination flag F[i] is 0, is 0.14, 0.15 or 0.16 when the rotation speed Ne of the engine 22 is 1000 rpm and the amount increasing determination flag F[i] is 1, is 0.018, 0.02 or 0.022 when the rotation speed Ne of the engine 22 is 6000 rpm and the amount increasing determination flag F[i] is 0, and is 0.008, 0.01 or 0.012 when the rotation speed Ne of the engine 22 is 6000 rpm and the amount increasing determination flag F[i] is 1. In another example, at the rotation speed Ne of the engine 22 of 2500 rpm, the misfire ratio Rmf is 0.19, 0.2 or 0.21 when the volume efficiency KL is 10% and the amount increasing determination flag F[i] is 0, is 0.14, 0.15 or 0.16 when the volume efficiency KL is 10% and the amount increasing determination flag F[i] is 1, is 0.018, 0.02 or 0.022 when the volume efficiency KL is 80% and the amount increasing determination flag F[i] is 0, and is 0.008, 0.01 or 0.012 when the volume efficiency KL is 80% and the amount increasing determination flag F[i] is 1. The reasons for such setting of the misfire ratio Rmf will be described later. The accumulated misfire ratio Rmfsum provides the smaller value when part of the amount increasing determination flags F[1] to F[4] is the value 1, compared with the accumulated misfire ratio Rmfsum when all the amount increasing determination flags F[1] to F[4] are the value 0. The accumulated misfire ratio Rmfsum provides the smaller value with an increase in number of cylinders having the amount increasing determination flag F[i] set to the value 1.

The engine ECU 24 subsequently increments an ignition counter Ci by value 1 (step S360). This ignition counter Ci is set to value 0 as an initial value when operation of the engine 22 is started and is reset to the value 0 by the processing of step S440 described later. According to this embodiment, the routine of FIG. 5 is performed every time the duration change amount ΔT30 is computed by the routine of FIG. 3 (every time ignition is performed in one of the cylinders). The ignition counter Ci accordingly indicates either the number of ignitions since a start of operation of the engine 22 or the number of ignitions after the ignition counter Ci is reset to 0.

The engine ECU 24 then compares the ignition counter Ci with a reference value Ciref (step S370). The reference value Ciref is a threshold value used to determine whether the engine 22 has a misfire and whether the conversion catalyst 134a is overheated and may be, for example, 1800, 2000 or 2200. When the ignition counter Ci is less than the reference value Ciref, the engine ECU 24 terminates this routine.

When the ignition counter Ci is equal to or greater than the reference value Ciref at step S370, on the other hand, the engine ECU 24 subsequently compares the misfire counter Cmf with a reference value Cmfref (step S380). The reference value Cmfref may be set to, for example, 0.02 times, 0.03 times or 0.04 times the reference value Ciref. When the misfire counter Cmf is equal to or less than the reference value Ciref, the engine ECU 24 determines that the engine 22 has no misfire (step S390). When the misfire counter Cmf is greater than the reference value Ciref, on the other hand, the engine ECU 24 determines that the engine 22 has a misfire (step S400) and lights the warning light 89a for misfire detection (step S405). This informs the driver of the occurrence of a misfire in the engine 22. Upon determination that the engine 22 has a misfire, information indicating the occurrence of a misfire in the engine 22 may be stored in a non-transitory memory (not shown) or the like, in addition to the lighting of the warning light 89a.

The engine ECU 24 subsequently compares the misfire counter Cmf with the accumulated misfire ratio Rmfsum (step S410). When the misfire counter Cmf is equal to or less than the accumulated misfire ratio Rmfsum, the engine ECU 24 determines that the conversion catalyst 134a is not overheated (step S420). When the misfire counter Cmf is greater than the accumulated misfire ratio Rmfsum, on the other hand, the engine ECU 24 determines that the conversion catalyst 134a is overheated (step S430) and lights the warning light 89b for catalyst overheat detection (step S435). This informs the driver of overheat of the conversion catalyst 134a. Upon determination that the conversion catalyst 134a is overheated, information indicating overheat of the conversion catalyst 134a may be stored in a non-transitory memory (not shown) or the like, in addition to lighting of the warning light 89b.

After determining whether the engine 22 has a misfire and whether the conversion catalyst 134a is overheated, the engine ECU 24 resets the misfire counter Cmf, the accumulated misfire ratio Rmfsum and the ignition counter Ci to the value 0 (step S440) and terminates this routine.

This configuration uses only one counter, i.e., the misfire counter Cmf, to determine whether the engine 22 has a misfire and whether the conversion catalyst 134a is overheated.

The following describes the reasons for setting the misfire ratio Rmf with the tendency shown in FIG. 6. The following is the reason for setting the smaller misfire ratio Rmf at the amount increasing determination flag F[i] of 1 than the value at the amount increasing determination flag F[i] of 0. In the case where a misfire occurs in the cylinder [i] by a trouble in the ignition system such as the ignition plug 130, a larger amount of non-combusted gas flows into the conversion catalyst 134a in the state that the amount of fuel injection is increased with regard to the cylinder [i] than the flow amount of non-combusted gas in the state that the amount of fuel injection is not increased. This increases a temperature rise rate of the catalyst by combustion reaction of the non-combusted gas with the catalyst and makes the catalyst more likely to be overheated. According to this embodiment, setting the smaller misfire ratio Rmf at the amount increasing determination flag F[i] of 1 than the value at the amount increasing determination flag F[i] of 0 provides the smaller accumulated misfire ratio Rmfsum when part of the amount increasing determination flags F[1] to F[4] is the value 1, compared with the accumulated misfire ratio Rmfsum when all the amount increasing determination flags F[1] to F[4] are the value 0. This enables overheat of the conversion catalyst 134a to be detected more reliably in the event that the conversion catalyst 134a is overheated. The accumulated misfire ratio Rmfsum provides the smaller value with an increase in number of cylinders having the amount increasing determination flag F[i] of 1. This configuration enables overheat of the conversion catalyst 134a to be detected more adequately according to the number of cylinders having the increased amount of fuel injection, in the event that the conversion catalyst 134a is overheated.

The following is the reason for setting the misfire ration Rmf to tend to decrease with an increase in rotation speed Ne of the engine 22 and with an increase in volume efficiency KL. The higher rotation speed Ne of the engine 22 and the higher volume efficiency KL lead to the higher amount of emission from the engine 22 per unit time. This is likely to increase the degree of a temperature rise of the conversion catalyst 134a and is likely to cause overheat of the conversion catalyst 134a. According to this embodiment, setting the misfire ration Rmf to tend to decrease with an increase in rotation speed Ne of the engine 22 and with an increase in volume efficiency KL provides the accumulated misfire ratio Rmfsum that tends to decrease with an increase in rotation speed Ne of the engine 22 and with an increase in volume efficiency KL. This enables overheat of the conversion catalyst 134a to be detected more reliably in the event that the conversion catalyst 134a is overheated.

As described above, at every ignition cycle, when the duration change amount $\Delta T30[i]$ with regard to the cylinder [i] as the current target cylinder is equal to or less than the reference value $\Delta T30ref2$, the engine apparatus mounted on the hybrid vehicle 20 of the embodiment keeps, the misfire counter Cmf unchanged. When the duration change amount $\Delta T30[i]$ is greater than the reference value $\Delta T30ref2$, the engine apparatus increments the misfire counter Cmf by value 1 and sets the misfire ratio Rmf to provide the smaller value in the case where the amount of fuel injection is increased with regard to the cylinder [i], compared with the value in the case where the amount of fuel injection is not increased. When the ignition counter Ci becomes equal to or greater than the reference value Ciref, the engine apparatus compares the misfire counter Cmf with the accumulated misfire ratio Rmfsum that is the accumulated value of the misfire ratio Rmf and determines whether the conversion catalyst 134a is overheated. This enables overheat of the conversion catalyst 134a to be determined (detected) more reliably in the state that the amount of fuel injection is increased in part of the cylinders of the engine 22.

The engine apparatus mounted on the hybrid vehicle 20 of the embodiment sets the misfire ratio Rmf, based on the amount increasing determination flag F[i] with regard to the cylinder [i], the rotation speed Ne of the engine 22 and the volume efficiency KL. According to a modification, the misfire ratio Rmf may be set, based on the amount increasing determination flag F[i] and either one of the rotation speed Ne of the engine 22 and the volume efficiency KL. According to another modification, the misfire ratio Rmf may be set, based on only the amount increasing determination flag F[i].

The engine apparatus mounted on the hybrid vehicle 20 of the embodiment uses the accumulated misfire ratio Rmfsum that is the accumulated value of the misfire ratio Rmf, as the reference value OTref used to determine whether the conversion catalyst 134a is overheated. The reference value OTref may be set in any of various ways to provide the smaller value when part of the amount increasing determination flags F[1] to F[4] is the value 1, compared with the value when all the amount increasing determination flags F[1] to F[4] are the value 0. For example, at every ignition cycle, the misfire ratio Rmf may be set, based on the rotation speed Ne of the engine 22 and the volume efficiency KL, irrespective of the amount increasing determination flag F[i]. In the case where the ignition counter Ci becomes equal to or greater than the reference value Ciref, the accumulated misfire ratio Rmfsum may be set to the reference value OTref when all the amount increasing determination flags F[1] to F[4] are the value 0. A smaller value than the accumulated misfire ratio Rmfsum may be set to the reference value OTref when part of the amount increasing determination flags F[1] to F[4] is the value 1.

The engine apparatus mounted on the hybrid vehicle 20 of the embodiment uses only one counter, i.e., the misfire counter Cmf, to determine whether the engine 22 has a misfire and determine whether the conversion catalyst 134a is overheated. According to a modification, different counters may be used for these determinations. In this modification, the misfire counter Cmf may be used for only the determination of whether the conversion catalyst 134a is overheated.

Upon determination that the engine 22 has a misfire or upon determination that the conversion catalyst 134a is overheated, the engine apparatus mounted on the hybrid vehicle 20 of the embodiment lights the warning light 89a or 89b to inform the driver of the occurrence of such an abnormality. According to a modification, the driver may be informed of the occurrence of an abnormality by providing a voice output from a speaker or providing a display output to a display, instead of lighting the warning light 89. According to another modification, the driver may not be informed of the occurrence of an abnormality.

The engine apparatus mounted on the hybrid vehicle 20 of the embodiment computes the 30-degree rotation duration T30 that is the time period required to rotate the crankshaft 26 by 30 degrees and computes the duration change amount ΔT30 from the 30-degree rotation duration T30. This angle is, however, not limited to 30 degrees but may be another angle, for example, 10 degrees or 20 degrees.

The engine apparatus mounted on the hybrid vehicle 20 of the embodiment computes the duration change amount ΔT30[i] by subtracting the 30-degree rotation duration T30[i−1] with regard to the cylinder [i−1] from the 30-degree rotation duration T30[i] with regard to the cylinder [i]. According to a modification, the duration change amount ΔT30[i] may be computed by subtracting a 30-degree rotation duration T30[i−2] with regard to a cylinder [i−2] from the 30-degree rotation duration T30[i] with regard to the cylinder [i].

The engine apparatus mounted on the hybrid vehicle 20 of the embodiment uses the four-cylinder engine 22 but may include an engine having a different number of cylinders such as six cylinders, eight cylinders or twelve cylinders.

The embodiment describes the configuration of the engine apparatus mounted on the hybrid vehicle 20 that includes the engine 22, the planetary gear 30 and the motors MG1 and MG2. The configuration of the engine apparatus may be mounted on a one-motor hybrid vehicle including an engine and one motor. The configuration of the engine apparatus may be mounted on an automobile that does not include a motor and runs with only the power from an engine. The configuration of the engine apparatus may also be mounted on stationary equipment such as construction equipment.

In the first engine apparatus of the disclosure, the controller may set a misfire ratio at every predetermined cycle, and may provide an accumulated value of the misfire ratio as the specified value when the number of ignitions reaches or exceeds the predetermined number of times. In this aspect, the controller may provide a smaller value as the misfire ratio set at every predetermined cycle when a target cylinder that is in the expansion stroke during such setting is a cylinder that performs the predetermined amount increasing operation, compared with a value when the target cylinder is not the cylinder that performs the predetermined amount increasing operation. This provides a smaller accumulated value of misfire ratio or a smaller third reference value when the predetermined amount increasing operation is performed with regard to part of the cylinders of the engine, compared with an accumulated value of misfire ratio when the predetermined amount increasing operation is not performed with regard to any of the cylinders of the engine. This also provides a smaller accumulated value of misfire ratio or a smaller third reference value with an increase in number of cylinders that performed the predetermined amount increasing operation. The misfire ratio may be set to provide a smaller value at a higher rotation speed of the engine than a value at a lower rotation speed of the engine and to provide a smaller value at a higher volume efficiency of the engine than a value at a lower volume efficiency of the engine. The higher rotation speed of the engine leads to the higher amount of emission from the engine per unit time and is likely to increase the degree of a temperature rise of the catalyst, compared with the lower rotation speed of the engine. The higher volume efficiency of the engine leads to the higher amount of emission from the engine per unit time and is likely to increase the degree of a temperature rise of the catalyst, compared with the lower volume efficiency of the engine.

The first engine apparatus of the disclosure may further include a notifier that is configured to provide a warning. The controller may control the notifier to provide a warning when determining that the catalyst is overheated. In the event that the catalyst is overheated, this notifies the user of the engine apparatus (driver when the engine apparatus is mounted on a motor vehicle) of overheat of the catalyst.

The following describes the correspondence relationship between the primary components of the embodiments and the primary components of the disclosure described in Summary. The engine 22 of the embodiment corresponds to the "engine", the catalytic converter 134 including the conversion catalyst 134a corresponds to the "catalytic converter", and the engine ECU 24 corresponds to the "controller".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The embodiment discussed above is to be considered in all aspects as illustrative and not restrictive. There may be many modifications, changes, and alterations without departing from the scope or spirit of the main characteristics of the present disclosure. The scope and spirit of the present subject matter are indicated by the appended claims, rather than by the foregoing description.

The present disclosure is applicable to, for example, manufacturing industries of engine apparatuses.

The invention claimed is:

1. An engine apparatus, comprising:
   an engine that is configured to have a plurality of cylinders;

a catalytic converter that is configured to include a catalyst for emission control of the engine; and a controller that is configured to compute an amount of change in a time period required for rotating an output shaft of the engine by a predetermined rotational angle at every predetermined cycle that is equal to or shorter than an ignition cycle of the engine, and when the amount of change is greater than a first reference value, to start a predetermined amount increasing operation with regard to a cylinder that is in an expansion stroke during computation of the amount of change among the plurality of cylinders, such as to increase an amount of fuel injection to be greater than an amount of fuel injection when the amount of change is equal to or less than the first reference value, wherein at every predetermined cycle, the controller keeps a value of a counter unchanged when the amount of change is equal to or less than a second reference value that is larger than the first reference value, while incrementing the value of the counter when the amount of change is greater than the second reference value, in a case where a number of ignitions in the engine reaches or exceeds a predetermined number of times, the controller determines that the catalyst is overheated when the value of the counter is larger than a specified value, and the controller provides a smaller value as the specified value when the predetermined amount increasing operation is performed with regard to part of the cylinders of the engine, compared with a value when the predetermined amount increasing operation is not performed with regard to any of the cylinders of the engine.

2. The engine apparatus according to claim 1, wherein the controller sets a misfire ratio at every predetermined cycle, and provides an accumulated value of the misfire ratio as the specified value when the number of ignitions reaches or exceeds the predetermined number of times.

3. The engine apparatus according to claim 2, wherein the controller provides a smaller value as the misfire ratio set at every predetermined cycle when a target cylinder that is in the expansion stroke during such setting is a cylinder that performs the predetermined amount increasing operation, compared with a value when the target cylinder is not the cylinder that performs the predetermined amount increasing operation.

4. The engine apparatus according to claim 2, wherein the misfire ratio is set to provide a smaller value at a higher rotation speed of the engine than a value at a lower rotation speed of the engine and to provide a smaller value at a higher volume efficiency of the engine than a value at a lower volume efficiency of the engine.

5. The engine apparatus according to claim 3, wherein the misfire ratio is set to provide a smaller value at a higher rotation speed of the engine than a value at a lower rotation speed of the engine and to provide a smaller value at a higher volume efficiency of the engine than a value at a lower volume efficiency of the engine.

6. An engine apparatus, comprising:

an engine that is configured to have a plurality of cylinders;

a catalytic converter that is configured to include a catalyst for emission control of the engine;

a notifier that is configured to provide a warning; and a controller that is configured to compute an amount of change in a time period required for rotating an output shaft of the engine by a predetermined rotational angle at every predetermined cycle that is equal to or shorter than an ignition cycle of the engine, and when the amount of change is greater than a first reference value, to start a predetermined amount increasing operation with regard to a cylinder that is in an expansion stroke during computation of the amount of change among the plurality of cylinders, such as to increase an amount of fuel injection to be greater than an amount of fuel injection when the amount of change is equal to or less than the first reference value, wherein at every predetermined cycle, the controller keeps a value of a counter unchanged when the amount of change is equal to or less than a second reference value that is larger than the first reference value, while incrementing the value of the counter when the amount of change is greater than the second reference value, in a case where a number of ignitions in the engine reaches or exceeds a predetermined number of times, the controller controls the notifier to provide a warning indicating that the catalyst is overheated when the value of the counter is larger than a specified value, and the controller provides a smaller value as the specified value when the predetermined amount increasing operation is performed with regard to part of the cylinders of the engine, compared with a value when the predetermined amount increasing operation is not performed with regard to any of the cylinders of the engine.

* * * * *